US012779889B2

(12) United States Patent
Shiba et al.

(10) Patent No.: US 12,779,889 B2
(45) Date of Patent: Nov. 3, 2026

(54) INK JET RECORDING METHOD AND INK JET RECORDING APPARATUS

(71) Applicant: CANON KABUSHIKI KAISHA, Tokyo (JP)

(72) Inventors: Tetsufumi Shiba, Kanagawa (JP); Eiichi Nakata, Kanagawa (JP); Yuko Negishi, Tokyo (JP); Ryo Tsujii, Tokyo (JP); Satoshi Takebayashi, Tokyo (JP); Sayoko Nagashima, Kanagawa (JP); Nao Ishijima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 86 days.

(21) Appl. No.: 19/035,513

(22) Filed: Jan. 23, 2025

(65) Prior Publication Data

US 2025/0242623 A1 Jul. 31, 2025

(30) Foreign Application Priority Data

Jan. 25, 2024 (JP) ................................ 2024-009741
Dec. 17, 2024 (JP) ................................ 2024-221045

(51) Int. Cl.
*B41J 2/145* (2006.01)
*B41M 3/00* (2006.01)
(Continued)

(52) U.S. Cl.
CPC .............. *B41M 3/001* (2013.01); *B41J 2/145* (2013.01); *C09D 11/104* (2013.01);
(Continued)

(58) Field of Classification Search
CPC ... B41J 2/145; B41J 2/21; B41J 2/2117; B41J 11/0022; B41J 11/0024; C09D 11/037;
(Continued)

(56) References Cited

U.S. PATENT DOCUMENTS

2008/0074462 A1* 3/2008 Hirakawa .............. B41J 2/2114 347/28
2015/0054883 A1* 2/2015 Okuda ................... C09D 11/40 524/556
(Continued)

FOREIGN PATENT DOCUMENTS

EP 4303005 A1 1/2024
JP 2010115854 A 5/2010
(Continued)

*Primary Examiner* — Anh T Vo
(74) *Attorney, Agent, or Firm* — Canon U.S.A., Inc. IP Division

(57) ABSTRACT

An ink jet recording method for recording an image on a low to non-absorbent recording medium. The method includes applying an ink such that the ink overlaps at least a part of a region of the recording medium to which a reaction liquid is applied. The ink contains a pigment that is dispersed by an action of an anionic group, a resin particle, a silicone-based surfactant and a hydrocarbon-based surfactant. The resin particle is a resin particle formed of at least one resin selected from the group consisting of an acrylic resin, a urethane resin and a polyester resin. The HLB value of the hydrocarbon-based surfactant determined by a Griffin method is 4 or more to 8 or less. A surface tension $\gamma_i$ of the ink and a surface tension $\gamma_r$ of the reaction liquid satisfy formula (1):

$$|\gamma_i - \gamma_r| \leq 3.8. \quad (1)$$

9 Claims, 1 Drawing Sheet

(51) Int. Cl.
*C09D 11/104* (2014.01)
*C09D 11/107* (2014.01)
*C09D 11/30* (2014.01)
*C09D 11/54* (2014.01)

(52) U.S. Cl.
CPC ............ *C09D 11/107* (2013.01); *C09D 11/30* (2013.01); *C09D 11/54* (2013.01)

(58) Field of Classification Search
CPC ..... C09D 11/104; C09D 11/107; C09D 11/30; C09D 11/322; C09D 11/38; C09D 11/40; C09D 11/54; B41M 3/001; B41M 7/009
See application file for complete search history.

(56) References Cited

U.S. PATENT DOCUMENTS

| | | | | |
|---|---|---|---|---|
| 2017/0210927 | A1 | 7/2017 | Kawamura | |
| 2017/0232762 | A1* | 8/2017 | Hirokawa | B41J 2/0057 347/101 |
| 2019/0009552 | A1* | 1/2019 | Kanke | B41J 11/0015 |
| 2019/0009602 | A1 | 1/2019 | Torisaka | |

FOREIGN PATENT DOCUMENTS

| | | | |
|---|---|---|---|
| JP | 2020180178 | A | 11/2020 |
| JP | 2023056486 | A | 4/2023 |
| JP | 2023101528 | A | 7/2023 |
| JP | 2023154399 | A | 10/2023 |

* cited by examiner

INK JET RECORDING METHOD AND INK JET RECORDING APPARATUS

BACKGROUND

Technical Field

The present disclosure relates to an ink jet recording method and an ink jet recording apparatus.

Description of the Related Art

In recent years, ink jet recording methods have been increasingly used in the field of signs and displays, for example, for recording of posters and large-sized advertisements. In this field, polyvinyl chloride sheets, polyethylene terephthalate (PET) sheets and the like are often used as recording media for reasons of their durability, cost, etc. These are recording media having no or almost no aqueous-ink-absorbing layer on their recording surface and are referred to as so-called non-absorbent recording media (recording media having no aqueous-ink absorbency) or low-absorbent recording media (recording media having low aqueous-ink absorbency). In recording an image on such a recording medium, a solvent-based ink, a curable ink or the like has been used in the related art. However, from the viewpoint of reduction in, for example, environmental loads and odors, there has been an increasing need for aqueous inks including aqueous media.

However, when an image is recorded on a low-absorbent or non-absorbent recording medium as described above, as compared to when an image is recorded on a recording medium having an absorbing layer, there has been a problem in that the coloration is low or sufficient image quality cannot be achieved with an aqueous ink as described above. To overcome this problem, there have been proposed printing methods in which printing is performed using a color ink composed of a colorant, a resin component, a water-soluble solvent and a surfactant and a reaction ink containing a reactant that aggregates the components of the color ink, and drying is performed (Japanese Patent Laid-Open No. 2010-115854, Japanese Patent Laid-Open No. 2023-154399 and Japanese Patent Laid-Open No. 2023-101528).

However, when an image was recorded on a low-absorbent or non-absorbent recording medium using the ink sets described in Japanese Patent Laid-Open No. 2010-115854, Japanese Patent Laid-Open No. 2023-154399 and Japanese Patent Laid-Open No. 2023-101528, streak-like unevenness occurred on recorded matter. This is probably due to the following phenomenon. Advection occurs during the process in which the liquid components of the ink and the reaction ink applied to the low-absorbent or non-absorbent recording medium become dry. When the next ink is applied thereto, the ink moves under the influence of the advection and cannot fix at a correct location, thus resulting in unevenness in recorded matter density and an appearance as streak-like unevenness.

In addition, when an image was recorded on a low-absorbent or non-absorbent recording medium using the ink sets described in Japanese Patent Laid-Open No. 2010-115854 and Japanese Patent Laid-Open No. 2023-154399, a solid image area with a low recording duty included some areas where the inks were not present and the recording medium as a base was exposed, and graininess could not be suppressed. The present inventors believe that this is because the inks do not spread on the low-absorbent or non-absorbent recording medium, and dots shrink as the inks dry.

SUMMARY

The present disclosure provides an ink jet recording method capable of recording an image in which image unevenness and graininess are suppressed. The present disclosure also provides an ink jet recording apparatus for use in the ink jet recording method.

Thus, the present disclosure provides an ink jet recording method for recording an image on a recording medium by ejecting, from a recording head, an aqueous ink and an aqueous reaction liquid containing a reactant that reacts with the aqueous ink. The ink jet recording method includes a reaction liquid application step of applying the aqueous reaction liquid to the recording medium and an ink application step of applying the aqueous ink such that the aqueous ink overlaps at least a part of a region of the recording medium to which the aqueous reaction liquid is applied. The amount of water absorption into the recording medium during a period from start of contact to 30 $msec^{1/2}$ in a Bristow method is 10 $mL/m^2$ or less. The aqueous ink contains a pigment that is dispersed by an action of an anionic group, a resin particle, a silicone-based surfactant and a hydrocarbon-based surfactant. The resin particle is a resin particle formed of at least one resin selected from the group consisting of an acrylic resin, a urethane resin and a polyester resin. A hydrophilic-lipophilic balance (HLB) value of the hydrocarbon-based surfactant determined by a Griffin method is 4 or more to 8 or less. A static surface tension $\gamma_i$ of the aqueous ink and a static surface tension $\gamma_r$ of the aqueous reaction liquid satisfy a relation of formula (1).

$$|\gamma_i - \gamma_r| \leq 3.8 \quad (1)$$

Further features of the present disclosure will become apparent from the following description of exemplary embodiments with reference to the attached drawings.

DESCRIPTION OF THE EMBODIMENTS

Figure 1:
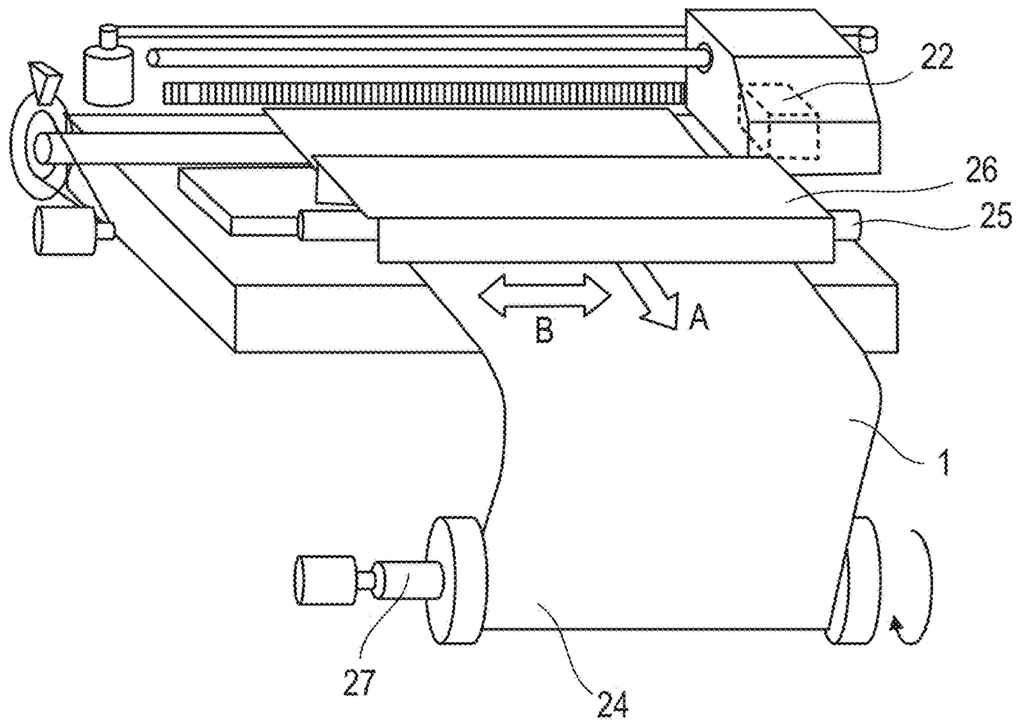
FIG. 1 is a perspective view schematically illustrating an embodiment of an ink jet recording apparatus according to the present disclosure.

Hereinafter, the present disclosure will be described in more detail with reference to exemplary embodiments. In the present disclosure, when a compound is a salt, the salt is dissociated into ions in an ink, but the expression "containing a salt" is used for convenience. An aqueous ink for ink jet recording and a reaction liquid for ink jet recording are also referred to simply as an "ink" and a "reaction liquid". Physical property values are values at normal temperature (25° C.) unless otherwise specified. The expressions "(meth) acrylic acid" and "(meth)acrylate" mean "acrylic acid, methacrylic acid" and "acrylate, methacrylate", respectively.

The present inventors performed the following evaluations using a reaction liquid and an ink with reference to the descriptions of Japanese Patent Laid-Open No. 2010-115854, Japanese Patent Laid-Open No. 2023-154399 and Japanese Patent Laid-Open No. 2023-101528. The ink used is a combination of a silicone-based surfactant and an acetylene-based surfactant. As a result of this test, it has been found that image unevenness due to a difference in color development density may occur. Furthermore, in some cases, graininess was observed because the ink was repelled by a recording medium in a solid image area with a low recording duty. Thus, the causes of them were investigated.

First, the present inventors observed a surface of an image under a light microscope, and found that there was a density difference due to movement of dots of the ink from their originally applied location on the recording medium. In addition, in light areas, traces of ink dots that had run off were observed. This showed that the ink dots were applied at correct locations on the recording medium but moved without fixing after the application, thus resulting in the density difference in the image, and hence image unevenness. This can be explained as follows: advection occurs when there is a difference in static surface tension between the ink and the reaction liquid applied to the low-absorbent or non-absorbent recording medium, and ink dots applied to locations where the advection has occurred moves from their originally applied locations under the influence of the advection and are fixed. This movement of the ink dots is called a “beading phenomenon”, and an image in which the beading phenomenon has occurred appears as having unevenness.

Here, when the same recording was performed on a low-absorbent or non-absorbent recording medium using an ink and a reaction liquid obtained by adjusting the ink and the reaction ink described above such that their values of static surface tension are close to each other, advection was successfully suppressed. This enabled subsequently applied ink dots to fix without moving from their originally applied locations, improving image unevenness. Specifically, when the absolute value of the difference between the static surface tension of the ink and the static surface tension of the reaction liquid was 3.8 or less, advection was suppressed, and image unevenness was suppressed. However, the suppression of image unevenness and the suppression of graininess have not yet reached the level required by the present inventors.

Next, the present inventors investigated the cause of graininess. The application of the ink to the low-absorbent or non-absorbent recording medium was checked, and it was found that ink dots, after being applied to the recording medium, did not spread but shrank as they dried, so that the recording medium as a base was exposed here and there. Thus, a hydrocarbon-based surfactant that aligns at the solid-liquid interface and can lower the static surface tension and a silicone-based surfactant that tends to align at the air-liquid interface were incorporated into the ink. As a result of this, wet spread of the ink on the recording medium was improved, and the recording medium as a base was uniformly covered with the ink, thus suppressing graininess.

Furthermore, by using a hydrocarbon-based surfactant having a low HLB value, specifically, a hydrocarbon-based surfactant having whose HLB value determined by a Griffin method is 4 or more to 8 or less, graininess can be suppressed. This is probably because such a surfactant can rapidly align at the solid-liquid interface to reduce the contact angle of the ink with respect to the recording medium, thereby improving the wet spread of the ink. When the HLB value of the hydrocarbon-based surfactant is less than 4, the hydrocarbon-based surfactant is not easily dissolved in the ink and is easily separated, and thus is less likely to exhibit surface activity. When the HLB value of the hydrocarbon-based surfactant is more than 8, the alignment at the solid-liquid interface is slow, and beading of the ink tends to occur. As a result, graininess of an image cannot be suppressed. When the silicone-based surfactant is used alone, wettability on the recording medium is insufficient, and graininess cannot be suppressed. When the hydrocarbon-based surfactant is used alone, the effect of suppressing image unevenness cannot be obtained.

The above-described ink needs to contain a resin particle formed of at least one resin selected from the group consisting of an acrylic resin, a urethane resin and a polyester resin. In the case of an ink not containing a resin particle, the reaction between a pigment and a reactant tends to proceed rapidly, and the pigment aggregates before the ink spreads wet on the recording medium, so that graininess cannot be suppressed.

The resin particle formed of at least one resin selected from the group consisting of an acrylic resin, a urethane resin and a polyester resin has polarity and can be stably present in the ink. Because of this, the resin particle has a lower tendency to interact with the surface of the particle of the pigment as compared with resin particles (e.g., a wax particle) other than the above. Thus, the resin particle is unlikely to inhibit the reaction between the pigment and the reactant and the fixation of the pigment, and allows the pigment to fix at a predetermined location on the recording medium, so that graininess and image unevenness can be suppressed. When a wax particle is used instead of the above resin particle, neither image unevenness nor graininess can be suppressed. The wax particle has low polarity and thus tends to interact with the surface of the particle of the pigment. Thus, the reaction between the pigment and the reactant is inhibited by the wax particle, making it difficult for the pigment to fix at a predetermined location on the recording medium, and image unevenness cannot be suppressed. In addition, since the ink does not easily fix at a predetermined location, ink droplets tend to coalesce, and graininess cannot be suppressed.

Furthermore, when recording was performed on an absorbent recording medium using the ink and the reaction liquid described above, image unevenness did not occur. This is because the ink and the reaction liquid do not remain on the surface of the absorbent recording medium, leaving no chance for advection to occur. That is, the disadvantage of image unevenness is a disadvantage peculiar to a low-absorbent or non-absorbent recording medium.

Ink Jet Recording Method and Ink Jet Recording Apparatus

An ink jet recording method according to the present disclosure is a method for recording an image on a recording medium by ejecting an aqueous ink and an aqueous reaction liquid from a recording head. The ink jet recording method includes a step of applying an aqueous reaction liquid to a recording medium (a reaction liquid application step) and a step of applying an aqueous ink such that the aqueous ink overlaps at least a part of a region of the recording medium to which the aqueous reaction liquid is applied (an ink application step).

An ink jet recording apparatus according to the present disclosure is an apparatus used to record an image on a recording medium by ejecting an aqueous ink and an aqueous reaction liquid from a recording head. The ink jet recording apparatus is an apparatus suitable for use in the ink jet recording method. The ink jet recording apparatus includes a unit configured to apply the aqueous reaction liquid to the recording medium (a reaction liquid application unit) and a unit configured to apply the aqueous ink such that the aqueous ink overlaps at least a part of a region of the recording medium to which the aqueous reaction liquid is applied (an ink application unit). In the ink jet recording method and the ink jet recording apparatus according to the present disclosure, it is not necessary to cure an image by irradiation with active energy rays or the like.

As the recording medium, a recording medium (low-absorbent or non-absorbent recording medium) whose amount of water absorption during a period from start of contact to 30 $msec^{1/2}$ in a Bristow method is 10 $mL/m^2$ or less is used. The aqueous reaction liquid contains a reactant that reacts with the aqueous ink. The aqueous ink contains a pigment that is dispersed by an action of an anionic group, a resin particle, a silicone-based surfactant and a hydrocarbon-based surfactant. The resin particle is a resin particle formed of at least one resin selected from the group consisting of an acrylic resin, a urethane resin and a polyester resin. An HLB value of the hydrocarbon-based surfactant determined by a Griffin method is 4 or more to 8 or less. A static surface tension $\gamma_i$ of the aqueous ink and a static surface tension $\gamma_r$ of the aqueous reaction liquid satisfy a relation of formula (1).

$$|\gamma_i - \gamma_r| \leq 3.8 \quad (1)$$

Hereinafter, the ink jet recording method and the ink jet recording apparatus (hereinafter also referred to simply as "the recording method and the recording apparatus") according to the present disclosure will be described in detail.

Ink Application Step and Reaction Liquid Application Step

The recording method according to the present disclosure includes a reaction liquid application step of applying a reaction liquid to a recording medium and an ink application step of applying an ink such that the ink overlaps at least a part of a region of the recording medium to which the reaction liquid is applied. As an ink application unit and a reaction liquid application unit of the recording apparatus, inkjet type recording heads are used. The ink and the reaction liquid may be ejected from different recording heads to record an image, or the ink and the reaction liquid may be ejected from each of a plurality of ejection port arrays provided in one recording element board to record an image.

Figure 2:
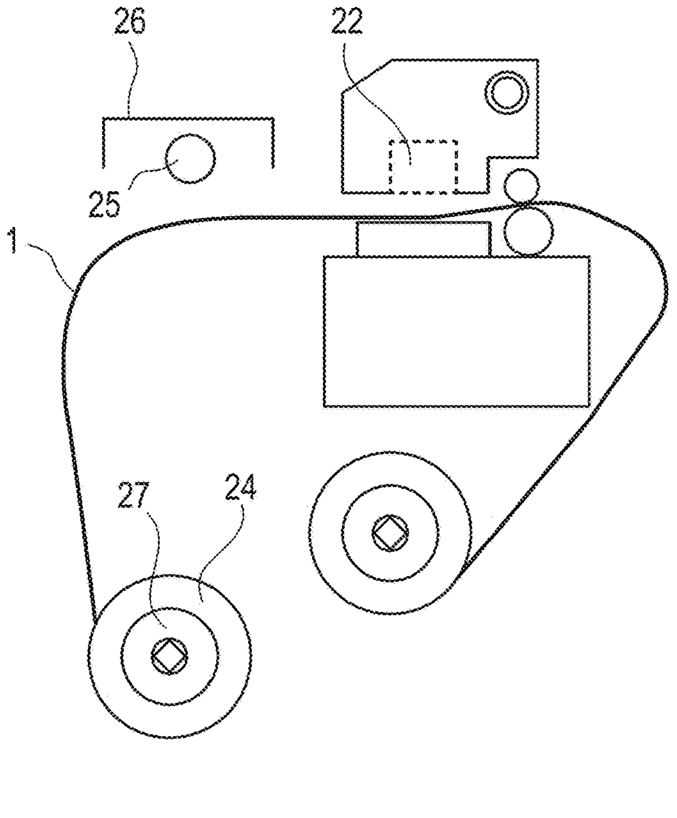
FIG. 2 is a side view schematically illustrating an embodiment of an ink jet recording apparatus according to the present disclosure.

FIG. 1 is a perspective view schematically illustrating an embodiment of an ink jet recording apparatus according to the present disclosure. FIG. 2 is a side view schematically illustrating an embodiment of an ink jet recording apparatus according to the present disclosure. As illustrated in FIGS. 1 and 2, the recording apparatus according to this embodiment includes an inkjet type recording head 22 configured to eject an ink. The recording head 22 is a recording head configured to eject an ink under the action of thermal energy. The recording head configured to eject an ink under the action of thermal energy applies an electric pulse to an electrothermal conversion element to thereby apply thermal energy to the ink, thus ejecting the ink through an ejection port. Although the recording head configured to eject an ink under the action of thermal energy is given as an example here, a recording head configured to eject an ink under the action of mechanical energy may be employed. The recording head may be provided with a mechanism (temperature control mechanism) for heating the aqueous ink to be ejected from the recording head. When the temperature control mechanism is provided, the temperature of the ink ejected from the recording head is preferably set to 35° C. or more to 70° C. or less.

The recording head 22 can include a first ejection port array in which ejection ports through which the aqueous ink is ejected are arranged along a sub-scanning direction and a second ejection port array in which ejection ports through which the aqueous reaction liquid is ejected are arranged along the sub-scanning direction. In this case, in the reaction liquid application step and the ink application step, the aqueous ink and the aqueous reaction liquid can be each ejected from the recording head to be applied to unit regions of the recording medium while the recording head is scanned in a main scanning direction intersecting the sub-scanning direction N times (N is an integer of 2 or more). The total amount of the aqueous reaction liquid applied to the recording medium in first-half N/2 scans of the N scans is preferably larger than the total amount of the aqueous reaction liquid applied to the recording medium in second-half N/2 scans of the N scans. When N is an odd number, the first-half N/2 is rounded up to the nearest whole number, and the second-half N/2 is rounded down to the nearest whole number. By this control, the ink can be stacked on the reaction liquid on the recording medium, and beading can be suppressed, so that graininess of an image can be more effectively suppressed. In particular, the total amount of the aqueous reaction liquid applied to the recording medium in the first-half N/2 scans is more preferably 60% or more of the total amount of the aqueous reaction liquid applied to the recording medium in the N scans. For the "unit region", the unit region can be defined as various regions as required, such as one pixel and one band. One pixel means one pixel corresponding to the resolution of the recording head, and one band means a region that is printable by one printing scan of the recording head in the main scanning direction.

Heating Step

In one embodiment, the recording method according to the present disclosure may include a step of heating (heat treating) the recording medium to which the ink and the reaction liquid have been applied. Heating the recording medium to which the ink and the reaction liquid have been applied can promote drying and increase the strength of an image.

Examples of the unit for heating the recording medium include heating units including known warming units such as heaters, air blowing units utilizing air blowing such as dryers, and combinations thereof. That is, the ink jet recording apparatus may be provided with a mechanism (heating unit) for heating the recording medium to which the ink and the reaction liquid have been applied. Examples of the heating unit include the above-described warming units, air blowing units, and combinations thereof. Examples of the method of the heat treatment include applying heat using a heater or the like from the side (rear surface) opposite to the recording surface (ink application surface) of the recording medium, applying warm air or hot air to the recording surface of the recording medium, and performing heating using an infrared heater from the recording surface or the rear surface. Two or more of them may be used in combination.

To provide an image with higher scratch resistance, the heating temperature of the recording medium to which the ink and the reaction liquid have been applied is preferably 50° C. or more to 90° C. or less. The heating temperature of the recording medium to which the ink and the reaction liquid have been applied can be rephrased as the temperature of a recorded image or the temperature reached as a result of heating of the recording medium to which the ink and the reaction liquid have been applied. The heating temperature of the recording medium to which the ink and the reaction liquid have been applied may be read with a sensor installed at a position corresponding to the heating unit of the recording apparatus, or may be determined from the relationship between the heat quantity predetermined according to the types of the ink and the recording medium and the temperature of the recording medium.

In the recording apparatus illustrated in FIGS. 1 and 2, a heater 25 supported by a frame (not illustrated) is disposed downstream, in a sub-scanning direction A, of a position where the recording head 22 is reciprocally scanned in a main scanning direction B. A recording medium 1 to which the ink has been applied can be heated with the heater 25. Specific examples of the heater 25 include sheathed heaters and halogen heaters. The heater 25 is covered by a heater cover 26. The heater cover 26 is a member for applying heat generated from the heater 25 efficiently to the recording medium 1. Furthermore, the heater cover 26 is also a member that protects the heater 25. The recording medium 1 to which the ink ejected from the recording head 22 has been applied is wound by a take-up spool 27 to form a roll-shaped wound medium 24.

Recording Medium

In the recording method and the recording apparatus according to the present disclosure, a low-absorbent or non-absorbent recording medium (low to non-absorbent recording medium) is used. The low to non-absorbent recording medium is a recording medium having the feature that the amount of water absorption during a period from start of contact to 30 $msec^{1/2}$ in a Bristow method described in Paper and Pulp Test Method No. 51 "Paper and Paperboard-Liquid Absorption Test Method" by JAPAN TAPPI, is 10 $mL/m^2$ or less. That is, in the recording method and the recording apparatus according to the present disclosure, a recording medium having the feature that the amount of water absorption during a period from start of contact to 30 $msec^{1/2}$ in the Bristow method is 0 $mL/m^2$ or more to 10 $mL/m^2$ or less is used. In this specification, a recording medium satisfying the condition of the amount of water absorption is defined as a "low to non-absorbent recording medium". Recording media for ink jet recording (e.g., glossy paper and matte paper) having a coating layer (ink-receiving layer) formed of an inorganic particle and plain paper not having a coating layer are "absorbent recording media" having the feature that the amount of water absorption is more than 10 $mL/m^2$.

Examples of low to non-absorbent recording media include plastic films; recording media including a substrate and a plastic film bonded to the recording surface side of the substrate; and recording media including a substrate containing cellulose pulp and a resin coating layer disposed on the recording surface of the substrate. Of these, plastic films may be used, and recording media including a substrate containing cellulose pulp and a resin coating layer disposed on the recording surface of the substrate may also be used.

When the ink containing a resin particle is applied to a non-absorbent recording medium, components such as water and a water-soluble organic solvent volatilize, and resin particles are concentrated. Fusion of the concentrated resin particles is promoted, and the strength of a recorded image is improved. On the other hand, when the ink is applied to a recording medium having high liquid component absorbency (absorbent recording medium), fusion of the resin particles are not easily promoted, and the strength of an image is not easily improved. The term "recording medium" as used herein refers to not a transfer body but a recording medium on which an image as recorded matter is to be recorded.

Reaction Liquid

The recording method according to the present disclosure includes a reaction liquid application step of applying an aqueous reaction liquid containing a reactant that reacts with the aqueous ink to the recording medium. In particular, the ink application step may be preceded by the reaction liquid application step, or the ink application step and the reaction liquid application step may be performed concurrently. Hereinafter, components and the like used in the reaction liquid will be described in detail.

Reactant

The reaction liquid, which reacts with the ink upon contact with the ink to aggregate components (anionic group-containing components such as resins, surfactants and self-dispersible pigments) in the ink, contains a reactant. Due to the presence of a reactant, the state of the presence of the anionic group-containing components in the ink can be destabilized when the ink and the reactant are brought into contact with each other on the recording medium, thus promoting coagulation of the ink. Examples of the reactant include cationic components such as polyvalent metal ions and cationic resins, and organic acids. One reactant may be used alone, or two or more reactants may be used in combination.

Examples of polyvalent metal ions constituting polyvalent metal salts include divalent metal ions such as $Ca^{2+}$, $Cu^{2+}$, $Ni^{2+}$, $Mg^{2+}$, $Sr^{2+}$, $Ba^{2+}$ and $Zn^{2+}$ and trivalent metal ions such as $Fe^{3+}$, $Cr^{3+}$, $Y^{3+}$ and $Al^{3+}$. To incorporate a polyvalent metal ion into the reaction liquid, a water-soluble polyvalent metal salt (or its hydrate) formed by combination of the polyvalent metal ion and an anion can be used. Examples of the anion include inorganic anions such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions such as $HCOO^-$, $(COO^-)_2$, $COOH(COO^-)$, $CH_3COO^-$, $C_2H_5COO^-$, $CH_3CH(OH)COO^-$, $C_2H_4(COO^-)_2$, $C_6H_5COO^-$, $C_6H_4(COO^-)_2$ and $CH_3SO_3^-$.

When a polyvalent metal ion is used as the reactant, its content (% by mass) in the reaction liquid in terms of polyvalent metal salt is preferably 1.0% by mass or more to 20.0% by mass or less based on the total mass of the reaction liquid. In this specification, "the content (% by mass) of the polyvalent metal salt" in the reaction liquid in the case where the polyvalent metal salt is a hydrate means "the content (% by mass) of an anhydride of the polyvalent metal salt" excluding water as the hydrate.

Examples of cationic resins include resins having a primary, secondary or tertiary amine structure and resins having a quaternary ammonium salt structure. Specific examples include resins having a structure such as vinylamine, allylamine, vinylimidazole, vinylpyridine, dimethylaminoethyl methacrylate, ethyleneimine, guanidine, diallyldimethylammonium chloride or alkylamine-epichlorohydrin condensate. To increase the solubility in the reaction liquid, a cationic resin may be used in combination with an acidic compound or may be subjected to a quaternization treatment. When a cationic resin is used as the reactant, the content (% by mass) of the cationic resin in the reaction liquid is preferably 0.1% by mass or more to 10.0% by mass or less based on the total mass of the reaction liquid.

The reaction liquid containing an organic acid has a buffer capacity in an acidic range (less than pH 7.0, preferably pH 2.0 to 5.0), whereby the anionic groups of the components present in the ink are efficiently converted into acid form and aggregated. Examples of the organic acid include monocarboxylic acids such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumarinic acid, and salts thereof; dicarboxylic acids such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids such as citric acid and trimellitic acid, and salts and hydrogen salts thereof; and tetracarboxylic acids such as pyromellitic acid, and salts and hydrogen salts thereof. When an organic acid is used as the reactant, the content (% by mass) of the organic acid in the reaction liquid is preferably 1.0% by mass or more to 50.0% by mass or less based on the total mass of the reaction liquid.

Aqueous Medium

The reaction liquid is an aqueous reaction liquid that contains at least water as an aqueous medium. Examples of aqueous media for use in the reaction liquid are the same as those of aqueous media that can be contained in the ink, which will be described later. The content (% by mass) of water in the reaction liquid is preferably 50.0% by mass or more, more preferably 60.0% by mass or more, and is preferably 90.0% by mass or less, based on the total mass of the reaction liquid.

Other Components

The reaction liquid may contain various other components as required. Examples of the other components are the same as those of other components that can be contained in the ink, which will be described later.

Physical Properties of Reaction Liquid

The reaction liquid is an aqueous reaction liquid applicable to the ink jet system. Thus, from the viewpoint of reliability, its physical property values may be appropriately controlled. Specifically, the static surface tension of the reaction liquid at 25° C. is preferably 20.0 mN/m or more to 60.0 mN/m or less, more preferably 20.0 mN/m or more to 35.0 mN/m or less. The static surface tension of the reaction liquid can be measured by a platinum plate method. The viscosity of the reaction liquid at 25° C. is preferably 1.0 mPa·s or more to 10.0 mPa·s or less. The viscosity of the reaction liquid can be measured in accordance with JIS Z 8803. For example, it can be measured using a rotational viscometer. The pH of the reaction liquid at 25° C. is preferably 5.0 or more to 9.5 or less, more preferably 6.0 or more to 9.0 or less.

When the static surface tension of the ink is $\gamma_i$ and the static surface tension of the reaction liquid is $\gamma_r$, $|\gamma_i - \gamma_r| \leq 4$ needs to be satisfied. In particular, the static surface tension $\gamma_r$ of the reaction liquid can be more than or equal to the static surface tension $\gamma_i$ of the ink, that is, the static surface tension $\gamma_i$ of the ink can be less than or equal to the static surface tension $\gamma_r$ of the reaction liquid, that is, a relation $\gamma_i \leq \gamma_r$ can be satisfied. When the ink and the reaction liquid are applied as adjacent dots to the recording medium, the ink flows to the reaction liquid having a higher static surface tension, and white spots can be reduced, so that graininess can be more effectively suppressed. The static surface tensions of the ink and the reaction liquid are both values at 25° C.

The contact angle of the ink with respect to the recording medium can be more than or equal to the contact angle of the reaction liquid with respect to the recording medium. That is, when the contact angle of the ink with respect to the recording medium is $\theta_i$, and the contact angle of the reaction liquid with respect to the recording medium is $\theta_r$, a relation $\theta_i \geq \theta_r$ can be satisfied. When the relation $\theta_i \geq \theta_r$ is satisfied, a dot of the reaction liquid is likely to flow toward an ink dot when the ink and the reaction liquid are applied to the recording medium. This helps the ink fix without moving from a location where the ink has been applied, and thus graininess can be more effectively suppressed. In particular, when $\theta_r$ is smaller than $\theta_i$, the wettability of the reaction liquid on the recording medium is better than that of the ink, and the probability of contact between the reactive liquid and the ink is increased, so that the ink can be reliably fixed at an intended location, and graininess can be particularly effectively suppressed.

The contact angle $\theta_i$ of the ink with respect to the recording medium is more preferably 55° or less, that is, more preferably satisfies a relation $\theta_i \leq 55°$, still more preferably satisfies a relation $30° \leq \theta_i \leq 55°$. When $\theta_i \leq 55°$ is satisfied, the recording medium is less likely to repel the ink, and image unevenness is more easily suppressed. The contact angle $\theta_r$ of the reaction liquid with respect to the recording medium is more preferably 25° or less, that is, more preferably satisfies a relation $\theta_r \leq 25°$, still more preferably satisfies a relation $10° \leq \theta_r \leq 25°$. When $\theta_r \leq 25°$ is satisfied, the probability of contact between the reactive liquid and the ink is increased, so that image unevenness is easily suppressed, and graininess can be more effectively suppressed. In EXAMPLES described later, the contact angles of the ink and the reaction liquid with respect to the recording medium were measured using a contact angle meter (trade name "DropMaster DMo-701", manufactured by Kyowa Interface Science Co., Ltd.). Needless to say, this is not the only contact angle meter that can be used in the present disclosure.

Ink

The recording method according to the present disclosure includes an ink application step of applying an ink such that the ink overlaps at least a part of a region of the recording medium to which the reaction liquid is applied. The ink used in the recording method is an aqueous ink for ink jet recording that contains a pigment that is dispersed by the action of an anionic group, a resin particle, a silicone-based surfactant and a hydrocarbon-based surfactant. Hereinafter, components and the like constituting the ink will be described in detail.

Pigment

The ink contains, as a color material, a pigment that is dispersed by the action of an anionic group. The content (% by mass) of the pigment in the ink is preferably 0.1% by mass or more to 15.0% by mass or less, more preferably 1.0% by mass or more to 10.0% by mass or less, based on the total mass of the ink.

Specific examples of the pigment include inorganic pigments such as carbon black and titanium oxide; and organic pigments such as azo, phthalocyanine, quinacridone, isoindolinone, imidazolone, diketopyrrolopyrrole and dioxazine. One pigment may be used alone, or two or more pigments may be used in combination.

With regard to a method of dispersing the pigment, a resin-dispersed pigment formed using a resin as a dispersant (resin dispersant) or a self-dispersible pigment in which a hydrophilic group is bonded to the surface of the particle of the pigment can be used. A resin-bonded pigment in which a resin-containing organic group is chemically bonded to the surface of the particle of the pigment or a microencapsulated pigment in which the surface of the particle of the pigment is coated with a resin or the like can also be used. Of these, pigments dispersed by different methods can also be used in combination. In particular, a resin-dispersed pigment in which a resin as a dispersant is physically adsorbed onto the surface of the particle of the pigment can be used, rather than the resin-bonded pigment and the microencapsulated pigment.

As a resin dispersant for dispersing the pigment in an aqueous medium, a dispersant that can disperse the pigment in the aqueous medium by the action of an anionic group can be used. As the resin dispersant, a resin having an anionic group can be used, and a resin as described later, particularly, a water-soluble resin, can be used. The content (% by mass) of the pigment in the ink is preferably 0.3 or more to 10.0 or less in terms of the mass ratio relative to the content of the resin dispersant.

The self-dispersible pigment may be a pigment in which an anionic group such as a carboxylic acid group, a sulfonic acid group or a phosphonic acid group is bonded to the surface of the particle of the pigment directly or through another atomic group (—R—). The anionic group may be in acid form or salt form, and the anionic group in salt form may be in a partially dissociated state or an entirely dissociated state. When the anionic group is in salt form, the cation serving as a counter ion may be, for example, an alkali metal cation, ammonium, or an organic ammonium. Specific examples of the other atomic group (—R—) include linear or branched alkylene groups having 1 to 12 carbon atoms, arylene groups such as a phenylene group and a naphthylene group, a carbonyl group, an imino group, an amide group, a sulfonyl group, an ester group and an ether group. A combination of these groups may also be used.

Resin

The ink may contain a resin. The content (% by mass) of the resin in the ink is preferably 0.1% by mass or more to 20.0% by mass or less, more preferably 0.5% by mass or more to 15.0% by mass or less, based on the total mass of the ink.

The resin can be added to the ink for the purpose of (i) stabilization of the dispersion state of the pigment, that is, as a resin dispersant or its aid. The resin can be added to the ink also for the purpose of (ii) improvement of various characteristics of an image to be recorded. The resin may be in the form of, for example, a block copolymer, a random copolymer, a graft copolymer or a combination thereof. The resin may be a water-soluble resin that can be dissolved in an aqueous medium or a resin particle dispersed in an aqueous medium.

Composition of Resin

Examples of the resin include an acrylic resin, a urethane resin, a polyester resin and an olefin resin. In particular, the resin may be an acrylic resin or a urethane resin, and may further be an acrylic resin constituted by a unit derived from (meth)acrylic acid or (meth)acrylate.

Acrylic Resin

The acrylic resin may have a hydrophilic unit and a hydrophobic unit as constitutional units. In particular, the acrylic resin may be a resin having a hydrophilic unit derived from (meth)acrylic acid and a hydrophobic unit derived from at least one selected from the group consisting of monomers having an aromatic ring and (meth)acrylate monomers. In particular, the acrylic resin may be a resin having a hydrophilic unit derived from (meth)acrylic acid and a hydrophobic unit derived from at least one monomer selected from the group consisting of styrene and α-methylstyrene. Such a resin is likely to interact with the pigment and thus is suitable for use as a resin dispersant for dispersing the pigment.

The hydrophilic unit is a unit having a hydrophilic group such as an anionic group. The hydrophilic unit can be formed by, for example, polymerizing a hydrophilic monomer having a hydrophilic group. Specific examples of the hydrophilic monomer having a hydrophilic group include acidic monomers having a carboxylic acid group, such as (meth)acrylic acid, itaconic acid, maleic acid and fumaric acid, and anionic monomers such as anhydrides and salts of these acidic monomers. Examples of cations constituting the salts of the acidic monomers include a lithium ion, a sodium ion, a potassium ion, an ammonium ion and an organic ammonium ion. The hydrophobic unit is a unit not having a hydrophilic group such as an anionic group. The hydrophobic unit can be formed by, for example, polymerizing a hydrophobic monomer not having a hydrophilic group such as an anionic group. Specific examples of the hydrophobic monomer include monomers having an aromatic ring, such as styrene, α-methylstyrene and benzyl (meth)acrylate; and (meth)acrylate monomers such as methyl (meth)acrylate, butyl (meth)acrylate, hexyl (meth)acrylate and 2-ethylhexyl (meth)acrylate.

Urethane Resin

The urethane resin can be obtained by, for example, reacting a polyisocyanate with a component (polyol or polyamine) that reacts with the polyisocyanate. A cross-linking agent or a chain extender may be further reacted. In particular, a urethane resin obtained by polymerizing at least a polyisocyanate, a polyol not having an acid group and a polyol having an acid group can be used.

The polyisocyanate is a compound having two or more isocyanate groups in its molecular structure. Examples of the polyisocyanate include aliphatic polyisocyanates and aromatic polyisocyanates. Examples of aliphatic polyisocyanates include polyisocyanates having a chain structure, such as tetramethylene diisocyanate and hexamethylene diisocyanate; and polyisocyanates having a cyclic structure, such as isophorone diisocyanate and hydrogenated xylylene diisocyanate. Examples of aromatic polyisocyanates include tolylene diisocyanate and 1,5-naphthylene diisocyanate. In particular, the polyisocyanate may be isophorone diisocyanate.

The polyol is a compound having two or more hydroxy groups in its molecular structure. Examples of the polyol include polyols not having an acid group, such as polyether polyol, polyester polyol and polycarbonate polyol; and polyol having an acid group. Examples of the polyether polyol include addition polymers of alkylene oxides and polyols; and glycols such as (poly)alkylene glycol. Examples of the polyester polyol include acid esters. Examples of the polycarbonate polyol include alkanediol-based polycarbonate diols. The number-average molecular weight of the polyol not having an acid group is preferably 400 or more to 4,500 or less. Examples of the polyol having an acid group include those having an acid group such as a carboxylic acid group, a sulfonic acid group, a phosphoric acid group or a phosphonic acid group. The acid group may form a salt, and examples of the salt include alkali metal salts, such as lithium salt, sodium salt and potassium salt, ammonium salt and organic ammonium salt. The polyol having an acid group may be a polyol having a carboxylic acid group, such as dimethylolacetic acid, dimethylolpropionic acid, dimethylolbutanoic acid or dimethylolbutyric acid, and may further be dimethylolpropionic acid or dimethylolbutanoic acid.

The polyamine is a compound having two or more "amino groups or imino groups" in its molecular structure. Examples of the polyamine include monoamines having a plurality of hydroxy groups, such as dimethylolethylamine and diethanolmethylamine; bifunctional polyamines such as ethylenediamine and propylenediamine; and polyamines having a functionality of 3 or more, such as diethylenetriamine and triethylenetetramine. For convenience, compounds having a plurality of hydroxy groups and one "amino group or imino group" are also listed as "polyamines".

In synthesizing the urethane resin, a cross-linking agent and a chain extender can be used. Typically, the cross-linking agent is used when a prepolymer is synthesized, and the chain extender is used when the prepolymer synthesized in advance is allowed to undergo chain extension reaction. Basically, the cross-linking agent and the chain extender can be appropriately selected from, for example, water, polyisocyanate, polyol and polyamine depending on the purpose such as cross-linking or chain extension.

Olefin Resin

Examples of the olefin resin include polyethylene and polypropylene.

Polyester Resin

The polyester resin can be obtained by reacting a polyhydric alcohol with a polycarboxylic acid.

Examples of the polyhydric alcohol include polyhydric alcohols from dihydric to tetrahydric alcohols. The polyhydric alcohol may have a structure such as a polyhydric alcohol having an aliphatic group, a polyhydric alcohol having an aromatic group, or a sugar alcohol. Specific examples of the polyhydric alcohol include dihydric alcohols such as ethylene glycol [1,2-ethanediol], neopentyl glycol [2,2-dimethyl-1,3-propanediol], 1,3-propanediol, 1,4-butanediol, benzenediol and 2,2-bis(4-hydroxyphenyl) propane [bisphenol A]; trihydric alcohols such as glycerin, trimethylolethane and trimethylolpropane; and tetrahydric alcohols such as pentaerythritol. The polyhydric alcohol can also be an oligomer (a low-molecular-weight polymer having a molecular weight of 1,000 or less).

Examples of the polycarboxylic acid that becomes, as a result of the reaction, a polycarboxylic acid-derived unit constituting the polyester resin include polycarboxylic acids from dicarboxylic to tetracarboxylic acids. The polycarboxylic acid may have a structure such as a polycarboxylic acid having an aliphatic group, a polycarboxylic acid having an aromatic group, or a nitrogen-containing polycarboxylic acid. Specific examples of the polycarboxylic acid dicarboxylic carboxylic acids such as glutaric acid, adipic acid, terephthalic acid, isophthalic acid and 2,6-naphthalenedicarboxylic acid; tricarboxylic acids such as trimellitic acid; and tetracarboxylic acids such as ethylenediaminetetraacetic acid. The polycarboxylic acid can also be an oligomer (a low-molecular-weight polymer having a molecular weight of 1,000 or less).

Properties of Resin

The acid value of the water-soluble resin is preferably 100 mgKOH/g or more to 250 mgKOH/g or less. In this specification, the acid value of a resin can be a value determined with a potentiometric titrator using a potassium hydroxide-methanol titrant. The weight-average molecular weight of the water-soluble resin is preferably 3,000 or more to 15,000 or less. In this specification, the weight-average molecular weight of a resin can be measured as a value determined by gel permeation chromatography (GPC) in terms of polystyrene.

Resin Particle

The ink contains a resin particle formed of at least one resin selected from the group consisting of an acrylic resin, a urethane resin and a polyester resin. The use of the resin particle formed of at least one resin selected from the group consisting of an acrylic resin, a urethane resin and a polyester resin can suppress graininess and image unevenness.

The content (% by mass) of the resin particle in the ink is preferably 0.1% by mass or more to 15.0% by mass or less, more preferably 1.0% by mass or more to 10.0% by mass or less, based on the total mass of the ink. The content (% by mass) of the resin particle in the ink is preferably 1.5 or more, more preferably 1.7 or more, in terms of the mass ratio relative to the content (% by mass) of the pigment. The mass ratio is preferably 10.0 or less. The resin particle is present in the ink in a dispersed state, that is, in the form of a resin emulsion.

The term "resin particle" as used herein means a resin that is present without dissolving in an aqueous medium in the ink and more specifically means a resin that can be present in the aqueous medium while forming a particle whose particle size can be measured by dynamic light scattering. By contrast, the term "water-soluble resin" means a resin that is present while dissolving in the aqueous medium in the ink.

Whether a resin corresponds to the "resin particle" can be determined according to the following method. First, a liquid containing a resin to be determined is provided, and the liquid is diluted with pure water such that the content of the resin is about 1.0% to prepare a sample. The particle size of the resin in the sample is then measured by dynamic light scattering. If a particle having a particle size is measured, the resin is determined to be a "resin particle" (i.e., "water-dispersible resin"). If a particle having a particle size is not measured, the resin is determined not to be a "resin particle" (i.e., "water-soluble resin"). The measurement conditions at this time can be, for example, SetZero: 30 seconds, the number of measurements: 10, measurement time: 120 seconds, shape: spherical, refractive index: 1.5, density: 1.0.

As a particle size distribution measurement apparatus, a particle size analyzer (e.g., trade name "UPA-EX150", manufactured by Nikkiso Co., Ltd.) using dynamic light scattering or the like can be used. Needless to say, the particle size distribution measurement apparatus for use, the measurement conditions, etc. are not limited to those described above. By using the apparatus and conditions described above, the average particle size (volume-based 50% cumulative particle size) of the pigment can be measured.

The acid value of the resin forming the resin particle is preferably 5 mgKOH/g or more to 100 mgKOH/g or less. The weight-average molecular weight of the resin forming the resin particle is preferably 1,000 or more to 3,000,000 or less, more preferably 100,000 or more to 3,000,000 or less. The volume-based 50% cumulative particle size ($D_{50}$) of the resin particle measured by dynamic light scattering is preferably 50 nm or more to 500 nm or less. The volume-based 50% cumulative particle size of the resin particle is the particle diameter at which the volume cumulated from the small particle size side reaches 50% of the total volume of measured particles in a particle-size cumulative curve. The volume-based 50% cumulative particle size of the resin particle can be measured with the above particle size analyzer using dynamic light scattering under the above measurement conditions. The glass transition temperature of the resin particle is preferably 40° C. or more to 120° C. or less, more preferably 50° C. or more to 100° C. or less. The glass transition temperature (° C.) of the resin particle can be measured using a differential scanning calorimeter (DSC). The resin particle need not necessarily contain a color material.

The resin forming the resin particle can be appropriately selected from the acrylic resin, the urethane resin and the polyester resin described in the above section of Resin. In particular, the resin forming the resin particle may be an acrylic resin, and may further be a copolymer having a first unit derived from (meth)acrylic acid and a second unit derived from (meth)acrylate.

Surfactant

The ink contains a silicone-based surfactant and a hydrocarbon-based surfactant. The silicone-based surfactant can rapidly align at the air-liquid interface to lower the static surface tension of the liquid. The hydrocarbon-based surfactant can rapidly align at the solid-liquid interface to improve the wettability of the liquid on the recording medium.

The content (% by mass) of the silicone-based surfactant in the ink is preferably 0.2% by mass or more to 2.0% by mass or less, more preferably 0.4% by mass or more to 1.0% by mass or less, based on the total mass of the ink. When the content of the silicone-based surfactant in the ink is 0.2% by mass or more, the ink easily spreads wet on the recording medium, so that beading is easily suppressed, and graininess of an image can be more effectively suppressed. When the content of the silicone-based surfactant in the ink is 2.0% by mass or less, the storage stability of the ink is easily provided.

The silicone-based surfactant is a surfactant obtained by introducing a hydrophilic group such as an ethylene oxide group to a polyorganosiloxane whose main skeleton (main chain) is a siloxane bond (SiO) consisting of alternating silicon (Si) and oxygen (O) atoms. Examples of the silicone-based surfactant include polyether-modified siloxane compounds, alkyl polyether-modified siloxane compounds, alkyl silicone dendron polyether-modified siloxane compounds and alkyl silicone dendron diglycerin-modified siloxane compounds. The silicone-based surfactant can contain a propylene oxide unit as the side chain. Here, "contain a propylene oxide unit as the side chain" can be rephrased as "have a propylene oxide unit introduced into a silicon atom not at the ends of the polyorganosiloxane". In general, a silicone-based surfactant is often modified with ethylene oxide in the side chain, and being modified with propylene oxide, which is more hydrophobic, in the side chain can suppress thermal hydrolysis. Thus, the storage stability of the ink is further improved.

In particular, the silicone-based surfactant may be a compound represented by general formula (1). That is, the silicone-based surfactant may have both a propylene oxide unit and an ethylene oxide unit in the side chain. The silicone-based surfactant having the units with different hydrophilicity in the side chain can be rapidly adsorbed onto the pigment and the resin particle in the aqueous ink to moderately destabilize the dispersion state, thereby enhancing the aggregation with the reactant. In addition, such a silicone-based surfactant can align fast at the interface to rapidly lower the static surface tension, thus improving the wettability of the aqueous ink on the recording medium. Thus, graininess of an image can be more effectively suppressed.

(1)

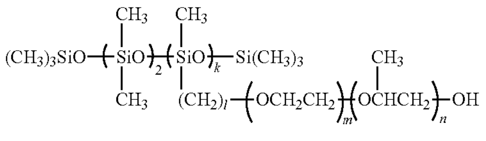

In general formula (1), k represents an integer of 1 to 3, 1 represents an integer of 1 to 4, m+n represents an integer of 8 to 15, and m and n are natural numbers.

As the hydrocarbon-based surfactant, a hydrocarbon-based surfactant whose HLB value determined by the Griffin method is 4 or more to 8 or less is used. A hydrocarbon-based surfactant whose HLB value is less than 4 is not easily dissolved stably in the ink and is easily separated, so that the ink cannot be stably ejected. A hydrocarbon-based surfactant whose HLB value is more than 8 aligns slowly at the solid-liquid interface and easily causes beading of the ink, and thus graininess of an image cannot be suppressed. The HLB value of the hydrocarbon-based surfactant determined by the Griffin method is preferably 4 or more to 6 or less. When the HLB value of the hydrocarbon-based surfactant determined by the Griffin method is 4 or more to 6 or less, graininess of an image can be more effectively suppressed.

A hydrocarbon-based nonionic surfactant is a surfactant having a hydrocarbon chain as the main skeleton into which a hydrophilic group such as an ethylene oxide group is introduced. Examples of the hydrocarbon-based nonionic surfactant include polyoxyethylene alkyl ethers, acetylene-based surfactants such as ethylene oxide adducts of acetylene diol and acetylene glycol, polyoxyethylene-polyoxypropylene block copolymers and ethylene oxide adducts of polyhydric alcohols.

Among the hydrocarbon-based surfactants whose HLB values are 4 or more to 8 or less, acetylene-based surfactants such as ethylene oxide adducts of acetylene diol and acetylene glycol can be used. An acetylene-based surfactant includes an acetylene structure (—C≡C—) in the main chain formed of a hydrocarbon chain and also has a structure in which a hydrophilic group such as a hydroxy group or an ethylene oxide group is bonded to the main chain. The acetylene-based surfactant is less likely to form a micelle and rapidly aligns at the interface, and thus its contact angle with respect to the recording medium is small, and the spread of the ink is improved, so that graininess can be more effectively suppressed. In addition, the acetylene-based surfactant is considered to be not easily adsorbed onto the pigment or the resin particle and easily provides an ink having high storage stability.

The content (% by mass) of the hydrocarbon-based surfactant in the ink is preferably 0.01% by mass or more to 1.5% by mass or less, more preferably 0.05% by mass or more to 1.5% by mass or less, still more preferably 0.2% by mass or more to 1.5% by mass or less, based on the total mass of the ink. When the content of the hydrocarbon-based surfactant in the ink is 0.05% by mass or more, even 0.2% by mass or more, the ink tends to uniformly spread wet on the recording medium, and thus white spots and image unevenness are easily suppressed. When the content of the hydrocarbon-based surfactant in the ink is 1.5% by mass or less, the storage stability of the ink is easily provided.

Aqueous Medium

The ink is an aqueous ink that contains at least water as an aqueous medium. The ink can contain an aqueous medium that is water or a mixed solvent of water and a water-soluble organic solvent. As the water, deionized water or ion-exchanged water can be used. The content (% by mass) of the water in the ink is preferably 40.0% by mass or more to 95.0% by mass or less, more preferably 50.0% by mass or more to 90.0% by mass or less, based on the total mass of the ink.

As the water-soluble organic solvent, any solvent that can be used for an ink for ink jet recording, such as an alcohol, a (poly)alkylene glycol, a glycol ether, a nitrogen-containing solvent or a sulfur-containing solvent, can be used. One water-soluble organic solvent may be used alone, and two or more water-soluble organic solvents may be used in combination. The content (% by mass) of the water-soluble organic solvent in the ink is preferably 2.0% by mass or more to 50.0% by mass or less, more preferably 3.0% by mass or more to 45.0% by mass or less, based on the total mass of the ink.

Other Components

The ink may contain various other components as required. Examples of other components include various additives such as antifoaming agents, surfactants, pH adjusters, viscosity modifiers, anticorrosives, preservatives, antifungal agents, antioxidants and reducing inhibitors. However, the ink preferably does not contain the reactant contained in the reaction liquid.

Physical Properties of Ink

The ink is an aqueous ink applicable to the ink jet system. Thus, from the viewpoint of reliability, its physical property values may be appropriately controlled. Specifically, the static surface tension of the ink at 25° C. is preferably 20.0 mN/m or more to 60.0 mN/m or less, more preferably 20.0 mN/m or more to 35.0 mN/m or less. The viscosity of the ink at 25° C. is preferably 1.0 mPa·s or more to 10.0 mPa·s or less. The static surface tension and the viscosity of the ink can be measured by the same methods as the above-described methods for measuring the static surface tension and the viscosity of the reaction liquid. The pH of the ink at 25° C. is preferably 7.0 or more to 9.5 or less, more preferably 8.0 or more to 9.5 or less.

EXAMPLES

The present disclosure will now be described in more detail with reference to Examples and Comparative Examples, but the present disclosure not in any way limited by the following Examples without departing from the gist thereof. For the amounts of components, "parts" and "%" are by mass unless otherwise specified.

Preparation of Reaction Liquid

Components (unit: %) shown in Table 1 were mixed and thoroughly stirred, after which the mixtures were subjected to a pressure filtration using a membrane filter (trade name "HDCII Filter", manufactured by Pall Corporation.) with a pore size of 4.5 μm to prepare reaction liquids. "Catiomaster PD-7" shown in Table 1 is the trade name of an aqueous solution (solid content: 50.0%) of a dimethylamine-epichlorohydrin condensate, which is a cationic resin manufactured by Yokkaichi Chemical Co., Ltd. "Acetylenol E60" shown in Table 1 is the trade name of a surfactant manufactured by Kawaken Fine Chemicals Co., Ltd., and "Surfynol 420" is the trade name of a surfactant manufactured by Nissin Chemical Co., Ltd. In the bottom row of Table 1, the static surface tension (mN/m) of the reaction liquids at 25° C. is shown. The static surface tension of the reaction liquids was measured by a platinum plate method using a surface tensiometer (trade name "Automatic surface tensiometer DY-300 model"; manufactured by Kyowa Interface Science Co., Ltd.).

TABLE 1

Composition and properties of reaction liquid

| | Reaction liquid | | | | | | |
|---|---|---|---|---|---|---|---|
| | 1 | 2 | 3 | 4 | 5 | 6 | 7 |
| Magnesium sulfate heptahydrate | 4.1 | | 2.0 | 4.1 | 4.1 | 4.1 | 4.1 |
| Succinic acid | | 2.0 | 1.0 | | | | |
| Catiomaster PD-7 | 1.0 | 1.0 | 1.0 | 1.0 | 1.0 | 1.0 | 1.0 |
| 1,2-Butanediol | 15.0 | 15.0 | 15.0 | 15.0 | 15.0 | 15.0 | 15.0 |
| Acetylenol E60 | 1.0 | 1.0 | 1.0 | 0.5 | 0.9 | 0.8 | 1.0 |
| Surfynol 420 | | | | | | | 0.2 |
| Ion-exchanged water | 78.9 | 81.0 | 80.0 | 79.4 | 79.0 | 79.1 | 78.7 |
| Static surface tension $\gamma_r$ (mN/m) | 27.0 | 27.0 | 27.0 | 28.0 | 28.0 | 29.0 | 23.0 |

Preparation of Pigment Dispersion

Preparation of Resin Dispersant

A styrene-ethyl acrylate-acrylic acid copolymer (resin 1) having an acid value of 150 mgKOH/g and a weight-average molecular weight of 8,000 was provided. Resin 1 in an amount of 20.0 parts was neutralized with potassium hydroxide in an amount equimolar to the acid value thereof, and an appropriate amount of ion-exchanged water was added thereto to prepare an aqueous solution of resin 1 with a resin content (solid content) of 20.0%.

A butyl acrylate/benzyl methacrylate/methoxypolyethylene glycol monomethacrylate copolymer (resin 2, water-soluble resin, composition (molar) ratio=30.0/60.0/10.0, acid value: 0 mgKOH/g) was provided. An appropriate amount of ion-exchanged water was added to 20.0 parts of resin 2 to prepare an aqueous solution of resin 2 with a resin content (solid content) of 20.0%. As methoxypolyethylene glycol monomethacrylate, "Blemmer PME-400" (trade name, manufactured by NOF Corporation, the number of moles of ethylene oxide groups added: about 9) was used.

Pigment Dispersion Liquids 1 to 5

Mixtures of components (unit: %) shown in upper rows of Table 2 were subjected to a 50-pass dispersion treatment at a pressure of 150 MPa using a Nanomizer (manufactured by YOSHIDA KIKAI CO., LTD.). Coarse particles were removed by centrifugation at a rotational speed of 5,000 rpm for 30 minutes, and then pressure filtration was performed using a cellulose acetate filter (manufactured by ADVANTEC) with a pore size of 3.0 μm. Dilution was performed by adding an appropriate amount of ion-exchanged water to obtain pigment dispersion liquids 1 to 5 having a pigment content of 10.0% and a resin dispersant content of 3.0%.

TABLE 2

Preparation conditions and properties of pigment dispersion liquid

| | Pigment dispersion liquid | | | | |
|---|---|---|---|---|---|
| | 1 | 2 | 3 | 4 | 5 |
| Carbon black | 20.0 | | | | 20.0 |
| C.I. pigment blue 15:3 | | 20.0 | | | |
| C.I. pigment red 122 | | | 20.0 | | |
| C.I. pigment yellow 74 | | | | 20.0 | |
| Aqueous solution of resin 1 | 15.0 | 15.0 | 15.0 | 15.0 | |
| Aqueous solution of resin 2 | | | | | 15.0 |
| Ion-exchanged water | 65.0 | 65.0 | 65.0 | 65.0 | 65.0 |
| Pigment content (%) | 10.0 | 10.0 | 10.0 | 10.0 | 10.0 |
| Resin dispersant content %) | 3.0 | 3.0 | 3.0 | 3.0 | 3.0 |

Preparation of Resin Particle

Resin Particle 1

Ion-exchanged water in an amount of 1,160 parts was placed in a reactor and heated to 90° C. Potassium persulfate in an amount of 1.39 parts was dissolved in ion-exchanged water in an amount of 160 parts to prepare an initiator solution. The prepared initiator solution in an amount of 32.0 parts was added into the reactor and stirred. Separately, 159.4 parts of ion-exchanged water, 1.0 parts of methacrylic acid, 49.5 parts of methyl methacrylate, 23.5 parts of n-hexyl methacrylate, 26.0 parts of n-butyl methacrylate, 1.6 parts of isooctyl thioglycolate and 9.98 parts of an aqueous emulsifier solution were mixed to prepare a monomer solution. As the emulsifier, a "Rhodafac RS 710" (trade name, manufactured by Rhodia Novecare) was used, and an appropriate amount of ion-exchanged water was added thereto to prepare the aqueous emulsifier solution having an emulsifier content of 30.0%. The prepared aqueous monomer solution and 129.4 parts of the initiator solution were added dropwise into the reactor in parallel over 30 minutes, stirred, and then held at 90° C. for 3 hours to obtain a reaction product. After the reaction product obtained was cooled to 50° C., a 50% aqueous potassium hydroxide solution was added to adjust the pH to 8.5. After cooling to 25° C., the cooled product was filtered through a 200-mesh metal gauze (a filter in which 200 stainless steel wires were woven in each of the warp and weft directions in a 1-inch square). An appropriate amount of ion-exchanged water was added to obtain a water dispersion liquid of resin particle 1 with a resin particle content of 30.0%. The volume-based 50% cumulative particle size $D_{50}$ of resin particle 1 was 90 nm.

Resin Particle 2

A commercially available water dispersion liquid of a urethane resin particle (trade name "TAKELAC W-6010", manufactured by Mitsui Chemicals, Inc., volume-based 50% cumulative particle size $D_{50}$: 60 nm, resin particle content: 30.0%) was used as a water dispersion liquid of resin particle 2.

Resin Particle 3

A reaction vessel was mounted in an autoclave. The reaction vessel was charged with a mixture of 90.0 parts of ethylene glycol, 20.0 parts of bisphenol A, 45.0 parts of terephthalic acid, 45.0 parts of isophthalic acid and 7.0 parts of trimellitic acid. Thereafter, heating was performed at 220° C. for 4 hours to perform an esterification (dehydration condensation) reaction. Subsequently, the temperature was increased to 240° C., and the pressure in the autoclave was reduced to 13 Pa over 90 minutes, after which the reduced-pressure state at 240° C. and 13 Pa was maintained for 5 hours. Nitrogen gas was introduced into the reaction vessel to return the pressure to the atmospheric pressure, and then the temperature in the reaction vessel was lowered to 220° C. A catalyst (tetra-n-butyl titanate) and 3.0 parts of trimellitic acid were added, and the resulting mixture was heated at 220° C. for 2 hours to perform a transesterification reaction. The amount (mol) of the catalyst used was equal to $3\times10^{-4}\times$the total amount (mol) of polycarboxylic acid used. Thereafter, nitrogen gas was introduced into the reaction vessel to create a pressurized state, and a sheet-shaped resin was taken out. The resin was cooled to 25° C. and then pulverized with a crusher to obtain a polyester resin.

A beaker of 2.0 L capacity was equipped with a stirrer (trade name "Tornado Stirrer Standard SM-104", manufactured by AS ONE Corporation). The polyester resin obtained above and tetrahydrofuran were placed in the beaker and stirred at 25° C. to dissolve the resin. Next, a 5.0% aqueous sodium hydroxide solution in an amount corresponding to the neutralization ratio (mol %) based on the acid value of the resin was added, and the mixture was stirred for 30 minutes. Under stirring at 10° C. and 150 rpm, 900 parts of ion-exchanged water was added dropwise to the beaker at a rate of 20 mL/min. Thereafter, at an elevated temperature of 60° C., tetrahydrofuran was distilled off under reduced pressure, and furthermore, water was partially distilled off. The beaker was placed in a water bath and stirred at 85° C. and 300 rpm for 2 hours. Using a 150-mesh metal gauze (a filter in which 150 stainless steel wires were woven in each of the warp and weft directions in a 1-inch square), the contents of the beaker were filtered. An appropriate amount of ion-exchanged water was added to adjust the resin particle content to obtain a water dispersion liquid of resin particle 3 with a resin particle content of 25.0%. The volume-based 50% cumulative particle size $D_{50}$ of resin particle 3 was 120 nm.

Resin Particle 4

A mixture was obtained by mixing 25.0 parts of a wax, 5.0 parts of a nonionic dispersant, 1.0 parts of an anionic dispersant (ethylene-acrylic acid copolymer), 1.0 parts of triethanolamine and 68.0 parts of water. The wax used was a Fischer-Tropsch wax (trade name "FT-0165", melting point: 73° C., manufactured by NIPPON SEIRO CO., LTD.). The nonionic dispersant used was polyoxyethylene cetyl ether (trade name "NIKKOL BC-15", manufactured by Nikko Chemicals Co., Ltd.). The mixture was subjected to a dispersion treatment, and pressure filtration was performed using a cellulose acetate filter (manufactured by ADVANTEC) with a pore size of 3.0 μm, after which dilution with ion-exchanged water was performed to obtain a water dispersion liquid of resin particle 4 with a resin particle content of 25.0%. The volume-based 50% cumulative particle size of resin particle 4 was 180 nm.

Preparation of Water-Soluble Resin

In accordance with Production Example of "binder resin 28" described in Japanese Patent Laid-Open No. 2020-180178, a resin was synthesized, and an aqueous solution having a water-soluble resin content of 30.0% was obtained. The water-soluble resin is a random copolymer of methacrylic acid/2-hydroxyethyl methacrylate/methyl methacrylate/butyl methacrylate/styrene (mass ratio: 4.5/5.0/55.5/20.0/15.0).

Preparation of Surfactant

A compound of formula (1A) and a compound of formula (2), each being a silicone-based surfactant, were prepared.

(1A)

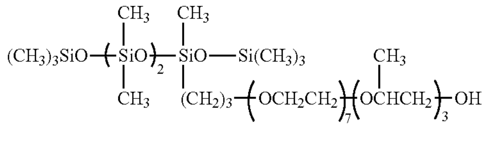

(2)

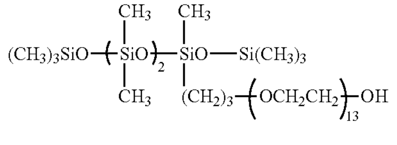

Hydrocarbon-based surfactants shown in Table 3 were prepared. The trade name "NIKKOL BS-4" is a surfactant manufactured by Nikko Chemicals Co., Ltd., and all the others are surfactants manufactured by Nissin Chemical Co., Ltd. Table 3 also shows the HLB value determined by the Griffin method.

TABLE 3

| Type of hydrocarbon-based surfactant | | |
|---|---|---|
| Surfactant (trade name) | Structure | HLB value |
| Surfynol 420 | acetylene-based | 4 |
| NIKKOL BS-4 | polyoxyethylene alkyl ether-based | 8 |
| Surfynol SE | acetylene-based | 6 |
| Olfine E1004 | acetylene-based | 7 |
| Surfynol 440 | acetylene-based | 8 |
| Surfynol DF110D | acetylene-based | 3 |
| Olfine PD-002W | acetylene-based | 9 |

Preparation of Ink

Components (unit: %) shown in middle rows of Table 4 were mixed and thoroughly stirred, after which the mixtures were subjected to pressure filtration using a membrane filter (trade name “HDCII filter”, manufactured by Pall Corporation.) with a pore size of 4.5 μm to prepare inks. In the bottom row of Table 4, the static surface tension (mN/m) of the inks at 25° C. is shown. The static surface tension of the inks was measured by a platinum plate method using a surface tensiometer (trade name “Automatic surface tensiometer DY-300 model”, manufactured by Kyowa Interface Science Co., Ltd.).

TABLE 4

Composition and properties of ink

| | Ink | | | | | | | | |
|---|---|---|---|---|---|---|---|---|---|
| | 1 | 2 | 3 | 4 | 5 | 6 | 7 | 8 | 9 |
| Pigment dispersion liquid 1 | 20.0 | | | | 20.0 | 20.0 | 20.0 | 20.0 | 20.0 |
| Pigment dispersion liquid 2 | | 20.0 | | | | | | | |
| Pigment dispersion liquid 3 | | | 20.0 | | | | | | |
| Pigment dispersion liquid 4 | | | | 20.0 | | | | | |
| Pigment dispersion liquid 5 | | | | | | | | | |
| Water dispersion liquid of resin particle 1 | 15.0 | 15.0 | 15.0 | 15.0 | | | 15.0 | 15.0 | 15.0 |
| Water dispersion liquid of resin particle 2 | | | | | 15.0 | | | | |
| Water dispersion liquid of resin particle 3 | | | | | | 15.0 | | | |
| Water dispersion liquid of resin particle 4 | | | | | | | | | |
| Aqueous solution of water-soluble resin | | | | | | | | | |
| 1,2-Butanediol | 15.0 | 15.0 | 15.0 | 15.0 | 15.0 | 15.0 | 15.0 | 15.0 | 15.0 |
| Compound of formula (1A) | 0.5 | 0.5 | 0.5 | 0.5 | 0.5 | 0.5 | 0.6 | 0.5 | 0.5 |
| Compound of formula (2) | | | | | | | | | |
| Surfynol 420 | 0.2 | 0.2 | 0.2 | 0.2 | 0.2 | 0.2 | 0.2 | | |
| NIKKOL BS-4 | | | | | | | | 0.4 | |
| Surfynol SE | | | | | | | | | 0.3 |
| Olfine E1004 | | | | | | | | | |
| Surfynol 440 | | | | | | | | | |
| Surfynol DF110D | | | | | | | | | |
| Olfine PD-002W | | | | | | | | | |
| Ion-exchanged water | 49.3 | 49.3 | 49.3 | 49.3 | 49.3 | 49.3 | 49.2 | 49.1 | 49.2 |
| Silicone-based surfactant content (%) | 0.5 | 0.5 | 0.5 | 0.5 | 0.5 | 0.5 | 0.6 | 0.5 | 0.5 |
| Hydrocarbon-based surfactant content (%) | 0.2 | 0.2 | 0.2 | 0.2 | 0.2 | 0.2 | 0.2 | 0.4 | 0.3 |
| Static surface tension $\gamma_i$ (mN/m) | 25.0 | 25.0 | 25.0 | 25.0 | 25.0 | 25.0 | 23.2 | 27.0 | 26.0 |

| | Ink | | | | | | | |
|---|---|---|---|---|---|---|---|---|
| | 10 | 11 | 12 | 13 | 14 | 15 | 16 | 17 |
| Pigment dispersion liquid 1 | 20.0 | 20.0 | 20.0 | 20.0 | 20.0 | 20.0 | | 20.0 |
| Pigment dispersion liquid 2 | | | | | | | | |
| Pigment dispersion liquid 3 | | | | | | | | |
| Pigment dispersion liquid 4 | | | | | | | | |
| Pigment dispersion liquid 5 | | | | | | | 20.0 | |
| Water dispersion liquid of resin particle 1 | 15.0 | 15.0 | 15.0 | 15.0 | 15.0 | 15.0 | 15.0 | |
| Water dispersion liquid of resin particle 2 | | | | | | | | |
| Water dispersion liquid of resin particle 3 | | | | | | | | |
| Water dispersion liquid of resin particle 4 | | | | | | | | |
| Aqueous solution of water-soluble resin | | | | | | | | |
| 1,2-Butanediol | 15.0 | 15.0 | 15.0 | 15.0 | 15.0 | 15.0 | 15.0 | 15.0 |
| Compound of formula (1A) | 0.5 | 0.5 | 0.5 | 0.5 | 0.5 | | 0.5 | 0.5 |
| Compound of formula (2) | | | | | | 0.5 | | |
| Surfynol 420 | | | 0.3 | 0.05 | 0.02 | 0.2 | 0.2 | 0.2 |
| NIKKOL BS-4 | | | | | | | | |
| Surfynol SE | | | | | | | | |
| Olfine E1004 | 0.3 | | | | | | | |
| Surfynol 440 | | 0.6 | | | | | | |
| Surfynol DF110D | | | | | | | | |
| Olfine PD-002W | | | | | | | | |
| Ion-exchanged water | 49.2 | 48.9 | 49.2 | 49.45 | 49.48 | 49.3 | 49.3 | 64.3 |
| Silicone-based surfactant content (%) | 0.5 | 0.5 | 0.5 | 0.5 | 0.5 | 0.5 | 0.5 | 0.5 |
| Hydrocarbon-based surfactant content (%) | 0.3 | 0.6 | 0.3 | 0.05 | 0.02 | 0.2 | 0.2 | 0.2 |
| Static surface tension $\gamma_i$ (mN/m) | 26.0 | 25.0 | 24.2 | 27.0 | 27.0 | 27.0 | 25.0 | 24.0 |

TABLE 4-continued

| Composition and properties of ink | | | | | | | | |
|---|---|---|---|---|---|---|---|---|
| | Ink | | | | | | | |
| | 18 | 19 | 20 | 21 | 22 | 23 | 24 | 25 |
| Pigment dispersion liquid 1 | 20.0 | 20.0 | 20.0 | 20.0 | 20.0 | 20.0 | 20.0 | 20.0 |
| Pigment dispersion liquid 2 | | | | | | | | |
| Pigment dispersion liquid 3 | | | | | | | | |
| Pigment dispersion liquid 4 | | | | | | | | |
| Pigment dispersion liquid 5 | | | | | | | | |
| Water dispersion liquid of resin particle 1 | | 15.0 | 15.0 | 15.0 | 15.0 | 15.0 | | 15.0 |
| Water dispersion liquid of resin particle 2 | | | | | | | | |
| Water dispersion liquid of resin particle 3 | | | | | | | | |
| Water dispersion liquid of resin particle 4 | 15.0 | | | | | | | |
| Aqueous solution of water-soluble resin | | | | | | | 15.0 | |
| 1,2-Butanediol | 15.0 | 15.0 | 15.0 | 15.0 | 15.0 | 15.0 | 15.0 | |
| Compound of formula (1A) | 0.5 | | 0.5 | 0.5 | 0.5 | 0.1 | 0.5 | 0.5 |
| Compound of formula (2) | | | | | | | | |
| Surfynol 420 | 0.2 | 0.2 | | | | 0.2 | 0.2 | 0.4 |
| NIKKOL BS-4 | | | | | | | | |
| Surfynol SE | | | | | | | | |
| Olfine E1004 | | | | | | | | |
| Surfynol 440 | | | | | | | | |
| Surfynol DF110D | | | | 0.2 | | | | |
| Olfine PD-002W | | | | | 1.0 | 1.0 | | |
| Ion-exchanged water | 49.3 | 49.8 | 49.5 | 49.3 | 48.5 | 48.7 | 49.3 | 64.1 |
| Silicone-based surfactant content (%) | 0.5 | 0.0 | 0.5 | 0.5 | 0.5 | 0.1 | 0.5 | 0.5 |
| Hydrocarbon-based surfactant content (%) | 0.2 | 0.2 | 0.0 | 0.2 | 1.0 | 1.2 | 0.2 | 0.4 |
| Static surface tension $\gamma_i$ (mN/m) | 25.0 | 35.0 | 25.0 | 21.0 | 26.0 | 32.0 | 25.0 | 23.1 |

Reaction Liquid Application Method

A recording head (see reference numeral 22 in FIG. 1) including a first ejection port array in which ejection ports through which an ink was ejected were arranged along a sub-scanning direction (see arrow A in FIG. 1) and a second ejection port array in which ejection ports through which a reaction liquid was ejected were arranged along the sub-scanning direction (see arrow A in FIG. 1) was used. While the recording head was scanned in a main scanning direction (see arrow B in FIG. 1) intersecting the sub-scanning direction (see arrow A in FIG. 1) N times (N was an integer of 1 or more), the ink and the reaction liquid were each ejected from the recording head to be applied to unit regions of a recording medium (see reference numeral 1 in FIG. 1). In EXAMPLES here, a unit region was set to a region of 1/1,200 inches×1/1,200 inches. Reaction liquid application methods 1 to 7 in which the amount of the reaction liquid applied to the recording medium in first-half N/2 scans of the N scans and the amount of the reaction liquid applied to the recording medium in second-half N/2 scans of the N scans were in the proportions (%) shown in Table 5 were employed.

TABLE 5

| Reaction liquid application method | | |
|---|---|---|
| | Amount of reaction liquid applied | |
| Reaction liquid application method | First-half N/2 scans (%) | Second-half N/2 scans (%) |
| 1 | 80 | 20 |
| 2 | 60 | 40 |
| 3 | 51 | 49 |
| 4 | 50 | 50 |
| 5 | 45 | 55 |
| 6 | 0 | 100 |
| 7 | 100 | 0 |

Preparation of Recording Medium

Recording media 1 and 2 shown below were prepared.

Recording medium 1: trade name "Scotchcal Graphic Film IJ1220N", manufactured by 3M, material=polyvinyl chloride, amount of water absorption during period from start of contact to 30 $msec^{1/2}$ in Bristow method=10 $mL/m^2$ or less.

Recording medium 2: High-Resolution Paper, trade name "HR-101S", manufactured by CANON KABUSHIKI KAISHA, amount of water absorption during period from start of contact to 30 $msec^{1/2}$ in Bristow method=more than 10 $mL/m^2$.

Evaluation

The prepared reaction liquids and inks were each loaded into a cartridge, and the cartridge was put in place in an ink jet recording apparatus (trade name "imagePROGRAF PRO-2000", manufactured by CANON KABUSHIKI KAISHA) including a recording head configured to eject an ink by thermal energy. In the recording apparatus, a heating device for drying a recording medium having the reaction liquid and the ink applied thereto was incorporated at a position downstream of the recording head in the conveyance direction of the recording medium. The recording head of the recording apparatus includes a first ejection port array in which ejection ports through which the ink is ejected are arranged along a sub-scanning direction and a second ejection port array in which ejection ports through which the reaction liquid is ejected are arranged along the sub-scanning direction. The recording environment was set to a temperature of 25° C. and a relative humidity of 50%. In EXAMPLES here, an image recorded under the condition where an ink droplet of 4.0 ng is applied to a unit region of 1/1,200 inches×1/1,200 inches is defined as an image with a recording duty of 100%.

After an image was recorded on the recording medium, the image was heated to dry such that the surface temperature of the recording medium became 80° C. by blowing hot air to the recording medium. The heating temperature was measured using a radiation thermometer. In EXAMPLES here, "AA", "A" and "B" in the evaluation criteria of the following items are acceptable levels, and "C" is an unacceptable level. The evaluation conditions and evaluation results are shown in Table 6. Table 6 shows, as the evaluation conditions, the static surface tension $\gamma_i$ of the ink and the static surface tension of $\gamma_r$ of the reaction liquid at 25° C. and the value of $|\gamma_i-\gamma_r|$, and the contact angle $\theta_i$ of the ink and the contact angle $\theta_r$ of the reaction liquid with respect to the recording medium shown in Table 6.

Suppression of Image Unevenness

Using the ink jet recording apparatus described above, the reaction liquid and the ink were applied according to the reaction liquid application method shown in Table 6 to record a 2 cm×2 cm solid image with a recording duty of 100% on the recording medium shown in Table 6. In the recorded image, ten dark areas and light areas were randomly selected by visual observation, and lightness (L*) was measured using a fluorescent spectrodensitometer (trade name "FD-7", manufactured by KONICA MINOLTA, INC.). L* is based on a color difference display method specified by CIE. Whether image unevenness was recognizable was determined by the value of the difference (ΔL*) between the lowest value and the highest value of measured L*, and suppression of image unevenness was evaluated according to the following evaluation criteria.

A: ΔL* was 0.20 or more.

B: ΔL* was more than 0.20 and 0.30 or less.

C: ΔL* was more than 0.30.

Suppression of Graininess

Using the ink jet recording apparatus described above, the reaction liquid and the ink were applied according to the reaction liquid application method shown in Table 6 to record a 2 cm×2 cm solid image with a recording duty of 100% and a 2 cm×2 cm solid image with a recording duty of 70% on the recording medium shown in Table 6. The recorded images were each observed visually and with a light microscope. The presence or absence of white spots was determined according to the following evaluation criteria, and granularity was evaluated by the presence or absence of white spots.

AA: In the solid images with the two recording duties, no white spots were observed even by microscopic observation.

A: In the solid image with a recording duty of 70%, white spots were observed by microscopic observation, but no white spots were observed by visual observation. In the solid image with a recording duty of 100%, no white spots were observed even with a microscope.

B: In the solid images with both the recording duties, white spots were observed by microscopic observation, but no white spots were observed by visual observation.

C: In the solid image with at least one recording duty, white spots were observed by visual observation.

TABLE 6

| Evaluation conditions and evaluation results | | | | | | | | | | |
|---|---|---|---|---|---|---|---|---|---|---|
| | | Evaluation conditions | | | | | | | Evaluation results | |
| | | Type of reaction liquid | Type of ink | Type of recording medium | Reaction liquid application method | $|\gamma_i-\gamma_r|$ (mN/m) | Contact angle of ink θi (°) | Contact angle of reaction liquid θr (°) | Suppression of image unevenness | Suppression of graininess |
| Example | 1 | 1 | 1 | 1 | 1 | 2.0 | 45 | 22 | A | AA |
| | 2 | 1 | 2 | 1 | 1 | 2.0 | 45 | 22 | A | AA |
| | 3 | 1 | 3 | 1 | 1 | 2.0 | 45 | 22 | A | AA |
| | 4 | 1 | 4 | 1 | 1 | 2.0 | 45 | 22 | A | AA |
| | 5 | 1 | 5 | 1 | 1 | 2.0 | 45 | 22 | A | AA |
| | 6 | 1 | 6 | 1 | 1 | 2.0 | 45 | 22 | A | AA |
| | 7 | 2 | 1 | 1 | 1 | 2.0 | 45 | 22 | A | AA |
| | 8 | 3 | 1 | 1 | 1 | 2.0 | 45 | 22 | A | AA |
| | 9 | 1 | 7 | 1 | 1 | 3.8 | 43 | 22 | A | AA |
| | 10 | 1 | 8 | 1 | 1 | 0.0 | 51 | 22 | A | B |
| | 11 | 1 | 9 | 1 | 1 | 1.0 | 47 | 22 | A | AA |
| | 12 | 1 | 10 | 1 | 1 | 1.0 | 49 | 22 | A | A |
| | 13 | 1 | 11 | 1 | 1 | 2.0 | 45 | 22 | A | A |
| | 14 | 1 | 1 | 1 | 2 | 2.0 | 45 | 22 | A | AA |
| | 15 | 1 | 1 | 1 | 3 | 2.0 | 45 | 22 | A | AA |
| | 16 | 1 | 1 | 1 | 4 | 2.0 | 45 | 22 | A | A |
| | 17 | 1 | 1 | 1 | 5 | 2.0 | 45 | 22 | A | B |
| | 18 | 1 | 1 | 1 | 6 | 2.0 | 45 | 22 | A | B |
| | 19 | 1 | 1 | 1 | 7 | 2.0 | 45 | 22 | A | B |
| | 20 | 4 | 1 | 1 | 1 | 3.0 | 45 | 45 | A | A |
| | 21 | 4 | 12 | 1 | 1 | 3.8 | 41 | 45 | A | B |
| | 22 | 1 | 13 | 1 | 1 | 0.0 | 55 | 22 | A | AA |
| | 23 | 1 | 14 | 1 | 1 | 0.0 | 60 | 22 | A | A |
| | 24 | 5 | 1 | 1 | 1 | 3.0 | 45 | 25 | A | AA |
| | 25 | 6 | 9 | 1 | 1 | 3.0 | 47 | 30 | A | A |
| | 26 | 7 | 1 | 1 | 1 | 2.0 | 45 | 20 | A | A |
| | 27 | 1 | 15 | 1 | 1 | 0.0 | 48 | 22 | B | A |
| Comparative Example | 1 | — | 1 | 1 | — | 25.0 | 45 | — | — | — |
| | 2 | 1 | 16 | 1 | 1 | 2.0 | 45 | 22 | C | C |
| | 3 | 1 | 17 | 1 | 1 | 3.0 | 45 | 22 | A | C |
| | 4 | 1 | 18 | 1 | 1 | 2.0 | 45 | 22 | C | C |
| | 5 | 1 | 19 | 1 | 1 | 8.0 | 47 | 22 | C | B |
| | 6 | 1 | 20 | 1 | 1 | 2.0 | 65 | 22 | B | C |

TABLE 6-continued

Evaluation conditions and evaluation results

| | | Evaluation conditions | | | | | | | Evaluation results | |
|---|---|---|---|---|---|---|---|---|---|---|
| | | Type of reaction liquid | Type of ink | Type of recording medium | Reaction liquid application method | $\lvert\gamma_i - \gamma_r\rvert$ (mN/m) | Contact angle of ink θi (°) | Contact angle of reaction liquid θr (°) | Suppression of image unevenness | Suppression of graininess |
| | 7 | 1 | 21 | 1 | 1 | 6.0 | 38 | 22 | — | — |
| | 8 | 1 | 22 | 1 | 1 | 1.0 | 65 | 22 | B | C |
| | 9 | 1 | 23 | 1 | 1 | 5.0 | 47 | 22 | C | B |
| | 10 | 1 | 24 | 1 | 1 | 2.0 | 45 | 22 | C | C |
| | 11 | 1 | 25 | 1 | 1 | 3.9 | 40 | 22 | C | B |
| Reference Example | 1 | 1 | 1 | 2 | 1 | 2.0 | — | — | A | AA |
| | 2 | 1 | 19 | 2 | 1 | 8.0 | — | — | A | AA |
| | 3 | 1 | 20 | 2 | 1 | 2.0 | — | — | A | AA |

In Comparative Example 1, the above evaluations could not be performed because the ink moved without fixing when an image was recorded. Ink 22 used in Comparative Example 7 underwent separation of the acetylene glycol-based surfactant from the ink, and thus the above evaluations could not be performed. Therefore, the columns of Evaluation results of Comparative Examples 1 and 7 are marked as "-".

According to the present disclosure, an ink jet recording method capable of recording an image in which image unevenness is suppressed and which has high granularity can be provided. According to the present disclosure, an ink jet recording apparatus for use in the ink jet recording method can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2024-009741, filed Jan. 25, 2024 and No. 2024-221045, filed Dec. 17, 2024, which are hereby incorporated by reference herein in their entirety.

What is claimed is:

1. An ink jet recording method for recording an image on a recording medium by ejecting, from a recording head, an aqueous ink and an aqueous reaction liquid comprising a reactant that reacts with the aqueous ink, the ink jet recording method comprising:

a reaction liquid application step of applying the aqueous reaction liquid to the recording medium; and an ink application step of applying the aqueous ink such that the aqueous ink overlaps at least a part of a region of the recording medium to which the aqueous reaction liquid is applied, wherein an amount of water absorption into the recording medium during a period from start of contact to 30 $msec^{1/2}$ in a Bristow method is 10 $mL/m^2$ or less, the aqueous ink comprises a pigment that is dispersed by an action of an anionic group, a resin particle, a silicone-based surfactant and a hydrocarbon-based surfactant, the resin particle is a resin particle formed of at least one resin selected from the group consisting of an acrylic resin, a urethane resin and a polyester resin, a hydrophilic-lipophilic balance (HLB) value of the hydrocarbon-based surfactant determined by a Griffin method is 4 or more to 8 or less, and a static surface tension $\gamma_i$ of the aqueous ink and a static surface tension $\gamma_r$ of the aqueous reaction liquid satisfy a relation of formula (1):

$$\lvert\gamma_i - \gamma_r\rvert \leq 3.8. \quad (1)$$

2. The ink jet recording method according to claim 1, wherein the hydrocarbon-based surfactant comprises an acetylene-based surfactant.

3. The ink jet recording method according to claim 1, wherein the HLB value of the hydrocarbon-based surfactant determined by the Griffin method is 4 or more to 6 or less.

4. The ink jet recording method according to claim 1, wherein the recording head includes a first ejection port array in which ejection ports through which the aqueous ink is ejected are arranged along a sub-scanning direction and a second ejection port array in which ejection ports through which the aqueous reaction liquid is ejected are arranged along the sub-scanning direction, in the reaction liquid application step and the ink application step, while the recording head is scanned in a main scanning direction intersecting the sub-scanning direction N times, the aqueous ink and the aqueous reaction liquid are each ejected from the recording head to be applied to unit regions of the recording medium, N is an integer of 2 or more, and a total amount of the aqueous reaction liquid applied to the recording medium in first-half N/2 scans of the N scans is larger than a total amount of the aqueous reaction liquid applied to the recording medium in second-half N/2 scans of the N scans.

5. The ink jet recording method according to claim 1, wherein a relation $\theta_i \geq \theta_r$ is satisfied, $\theta_i$ is a contact angle of the aqueous ink with respect to the recording medium, and $\theta_r$ is a contact angle of the aqueous reaction liquid with respect to the recording medium.

6. The ink jet recording method according to claim 1, wherein relations $\theta_i \leq 55°$ and $\theta_r \leq 25°$ are satisfied, $\theta_i$ is a contact angle of the aqueous ink with respect to the recording medium, and $\theta_r$ is a contact angle of the aqueous reaction liquid with respect to the recording medium.

7. The ink jet recording method according to claim 1, wherein the static surface tension $\gamma_i$ of the aqueous ink is less than or equal to the static surface tension $\gamma_r$ of the aqueous reaction liquid.

8. The ink jet recording method according to claim 1, wherein the silicone-based surfactant comprises a compound represented by formula (1):

(1)

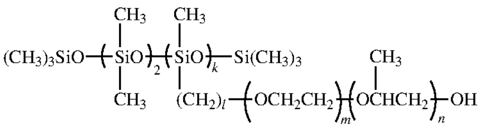

where, in formula (1), k represents an integer of 1 to 3, 1 represents an integer of 1 to 4, m+n represents an integer of 8 to 15, and m and n are natural numbers.

9. An ink jet recording apparatus used to record an image on a recording medium by ejecting, from a recording head, an aqueous ink and an aqueous reaction liquid containing a reactant that reacts with the aqueous ink, the ink jet recording apparatus comprising:

a reaction liquid application unit configured to apply the aqueous reaction liquid to the recording medium; and an ink application unit configured to apply the aqueous ink such that the aqueous ink overlaps at least a part of a region of the recording medium to which the aqueous reaction liquid is applied, wherein an amount of water absorption into the recording medium during a period from start of contact to 30 $msec^{1/2}$ in a Bristow method is 10 $mL/m^2$ or less, the aqueous ink comprises a pigment that is dispersed by an action of an anionic group, a resin particle, a silicone-based surfactant and a hydrocarbon-based surfactant, the resin particle is a resin particle formed of at least one resin selected from the group consisting of an acrylic resin, a urethane resin and a polyester resin, a hydrophilic-lipophilic balance (HLB) value of the hydrocarbon-based surfactant determined by a Griffin method is 4 or more to 8 or less, and a static surface tension $\gamma_i$ of the aqueous ink and a static surface tension $\gamma_r$ of the aqueous reaction liquid satisfy a relation of formula (1):

$$|\gamma_i - \gamma_r| \leq 3.8. \quad (1)$$

* * * * *